United States Patent [19]

Larson

[11] Patent Number: 5,062,397
[45] Date of Patent: Nov. 5, 1991

[54] VALVE STEM SEAL
[75] Inventor: Jay M. Larson, Marshall, Mich.
[73] Assignee: Eaton Corporation, Cleveland, Ohio
[21] Appl. No.: 578,379
[22] Filed: Sep. 7, 1990
[51] Int. Cl.$^5$ .............................................. F01L 3/08
[52] U.S. Cl. .................................. 123/188 P; 277/33; 277/168; 277/203
[58] Field of Search ............... 123/188 P; 277/168, 277/203, 207 R, 208, 33

[56] References Cited

U.S. PATENT DOCUMENTS

| | | | |
|---|---|---|---|
| 2,064,235 | 12/1936 | Wheeler | 277/203 |
| 2,153,284 | 4/1939 | Steiner | 123/188 |
| 2,418,674 | 4/1947 | Steiner | 123/188 P |
| 2,459,721 | 1/1949 | Poltorak | 277/DIG. 6 |
| 3,162,185 | 12/1964 | Knoblock | 123/188 P |
| 3,265,052 | 8/1966 | Goloff | 123/188 |
| 3,331,608 | 7/1967 | Charrault et al. | 277/203 |
| 3,601,420 | 8/1971 | Binford | 277/212 C |
| 4,022,294 | 5/1977 | Coulin | 184/6.9 |
| 4,101,140 | 7/1978 | Reid | 277/208 |
| 4,135,723 | 1/1979 | Urquhart | 277/203 |
| 4,273,343 | 6/1981 | Visser | 277/203 |
| 4,706,967 | 11/1987 | Ochsner | 277/33 |
| 4,744,571 | 5/1988 | Geberth, Jr. | 277/208 |
| 4,763,618 | 8/1988 | Stritzke | 123/188 P |
| 4,773,363 | 9/1988 | Stritzke | 123/188 P |
| 4,811,704 | 3/1989 | Boehmer | 123/188 P |
| 4,834,037 | 5/1989 | Lafever | 123/188 P |
| 4,944,498 | 7/1990 | Kortgen | 277/208 |

FOREIGN PATENT DOCUMENTS

| | | | |
|---|---|---|---|
| 958613 | 2/1957 | Fed. Rep. of Germany | 277/33 |
| 0145187 | 11/1980 | Fed. Rep. of Germany | 277/168 |
| 2124308 | 2/1984 | United Kingdom | 277/33 |

Primary Examiner—E. Rollins Cross
Assistant Examiner—Erick Solis
Attorney, Agent, or Firm—F. M. Sajovec

[57] ABSTRACT

A stem seal for a poppet valve in an internal combustion engine. The seal is a ring type seal received in a groove formed in the valve stem and in sealing engagement with the inside diameter of a tubular valve guide. In accordance with one aspect of the invention the seal element has a plurality of circumferetial ribs formed on its outer diameter, and in accordance with another aspect a helical rib is formed on the outer diameter.

10 Claims, 2 Drawing Sheets

VALVE STEM SEAL

The present invention relates to internal combustion engine poppet valves, and more particularly to an improved stem seal for such valves.

In conventional overhead valve internal combustion engines, intake and exhaust valves reciprocate in timed alternation to provide intermittent communication between the intake and exhaust manifolds and a combustion chamber. Lubrication is provided to the upper portions of the valves by a spray of lubricating oil within the valve cover, or by gravity flow from an associated rocker arm. Oil then flows downwardly along the upper free end of the valve stem toward the valve head.

Since temperatures in the combustion chamber may approach or exceed 1000 degrees Centigrade, any lubricating oil exposed to such temperatures will vaporize or burn, leaving behind deposits which may interfere with the proper seating of the valves. Also, there is a continuing effort to reduce the amount of oil introduced to the valve stem/valve guide interface as a means to reduce combustion product emission. It has thus become necessary to provide seals between the upper region of the valve stem within the valve cover and the valve guide which extends toward the manifolds and combustion chamber. A typical prior art valve stem seal is in the form of a cylinder which seats about the end of the valve guide, and which includes a resilient sealing element which slidingly seals against the moving valve stem. Such seals are effective to prevent oil from flowing along the valve stem except for a thin film on the valve stem which serves to provide adequate lubrication between the valve stem and the valve guide and between the stem and the sealing element; however, it is difficult to provide a seal which allows an optimum amount of oil at the stem/guide interface, and often such seals are so effective to stop the flow of oil that the interface is likely to become starved of lubricant thus requiring special surfaces on the valve stem, such as chromium plating to insure adequate wear resistance.

With the expanded use of turbocharging and supercharging another problem has developed in the use of prior art stem seals in that pressure developed on the manifold side of the valve stem in turbocharged or supercharged engines can cause the valve stem seal to become dislodged from the valve guide and/or from the valve stem.

In accordance with the present invention, the valve stem seal is placed on the valve stem in the form of a ring type seal which is received in an annular groove formed in the valve stem and seals against the inside diameter of the valve guide. In accordance with the invention the seal is generally rectangular in cross section with one or more distinct contact points on the outer diameter. In a preferred embodiment, the outside diameter of the sealing element has a ribbed configuration formed either by a plurality of concentric ribs, or by a single, helical rib.

This construction offers several advantages over prior art seals. The ring can be placed closed to the manifold side of the valve stem to provide better lubrication of the stem/guide interface while preventing excessive oil entry into intake and exhaust manifolds, and promote better cooling at the interface.

Other advantages include a reduction in the length of the valve by omitting the valve stem seal structure at the end of the valve guide, simplified engine assembly since the seal can be assembled to the valve by the valve manufacturer, improved centering of the valve within the valve guide and lower cost.

Other objectives and advantages of the present invention will be apparent from the following description when considered in connection with the accompanying drawings, wherein.

Figure 1:
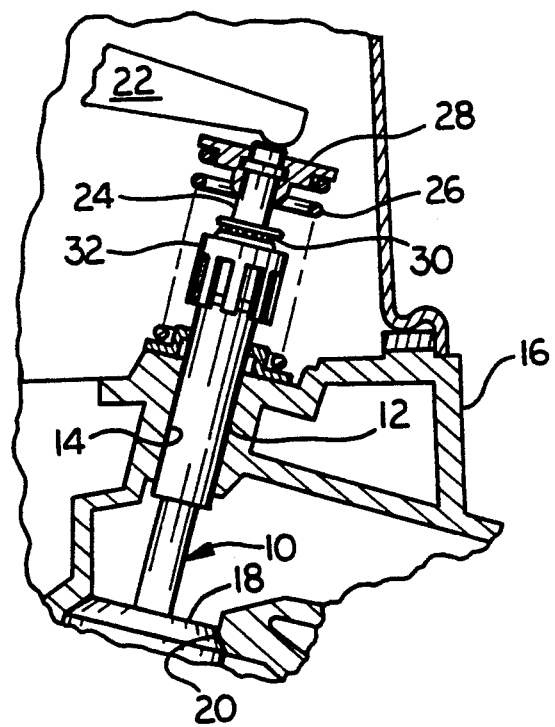
FIG. 1 is a fragmentary sectional view of a prior art valve stem seal in a typical operating environment.

Referring to FIG. 1, there is illustrated a typical poppet valve installation in an internal combustion engine incorporating a prior art valve stem seal. The installation follows the well-known practice wherein a poppet valve 10 is received within a valve guide 12 which is fixed in a bore 14 formed in the cylinder head 16 of an internal combustion engine. The valve includes a head 18 which seats against a valve seat 20 formed in the head, and is opened and closed by a rocker arm 22 or the like which contacts the tip of a stem portion 24 of the valve. The valve is biased closed by means of a spring 26 which acts between the cylinder head and a spring retainer 28 attached to the valve stem.

Figure 2:
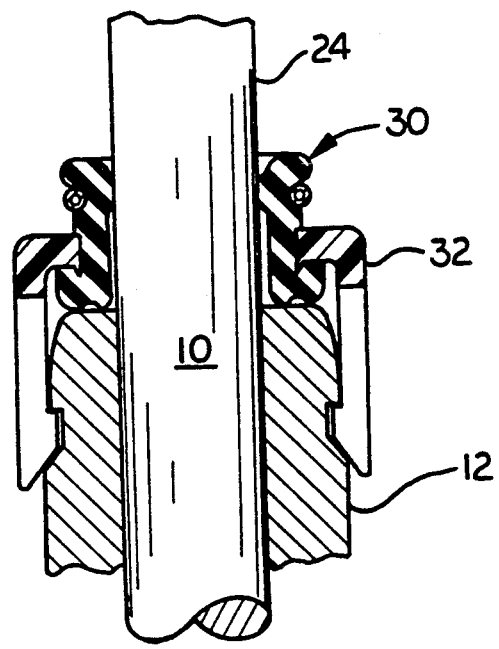
FIG. 2 is a sectional view of a typical prior art valve stem seal.

Referring also to FIG. 2, in a typical prior art application, a valve stem seal 30 formed of a suitable heat-resistant, resilient material is received over the valve stem on top of the valve guide 12 and retained on the stem by means of a plastic clip 32. A garter spring 34 received over the seal maintains sealing engagement with the valve stem.

Figure 4:
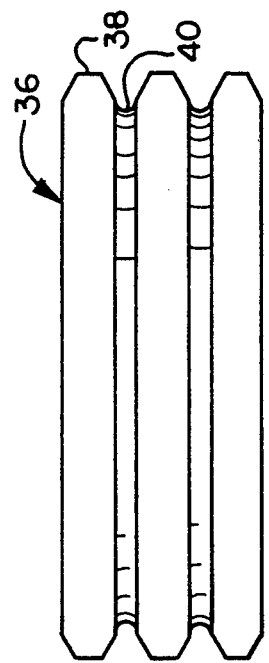
FIG. 4 is an elevation view of a preferred embodiment of the seal element of the present invention.
Figure 5:
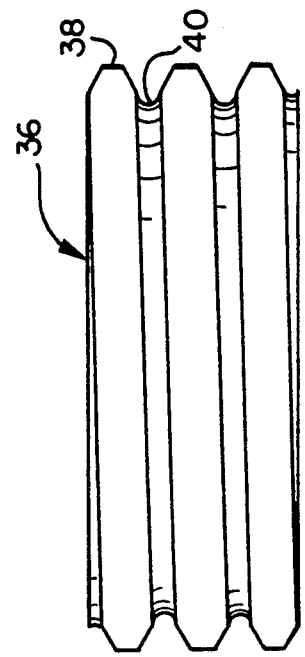
FIG. 5 is an elevation view of another embodiment of the seal element of the present invention.
Figure 3:
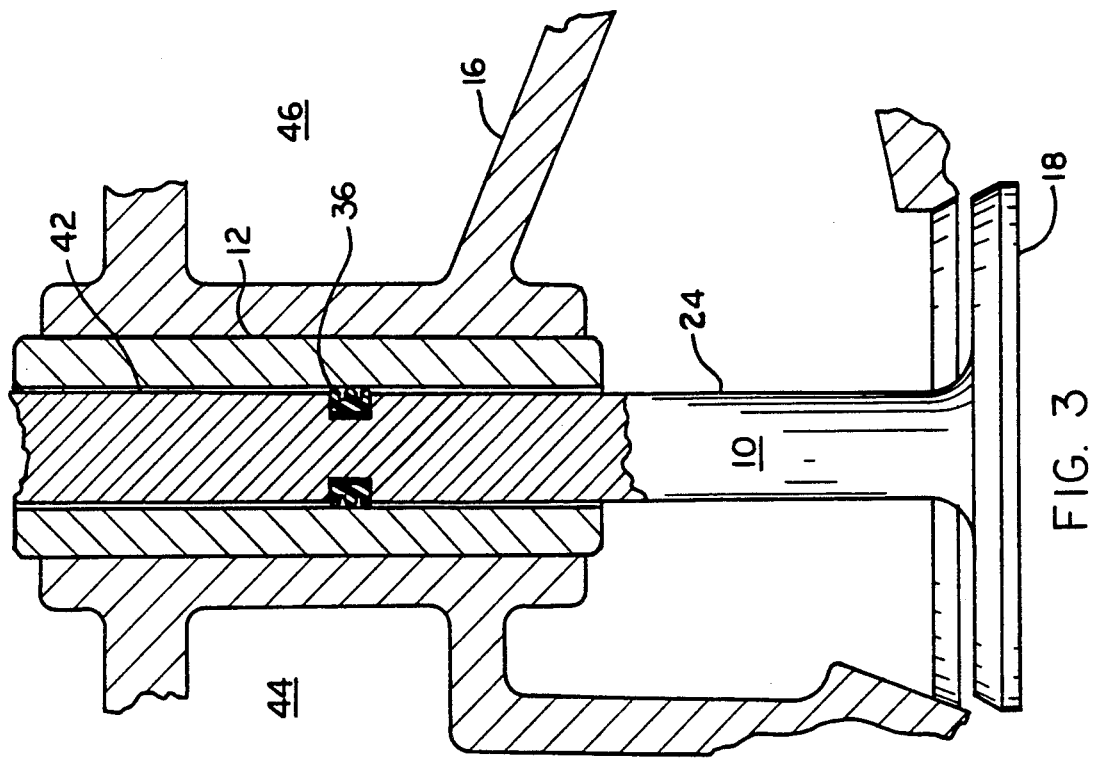
FIG. 3 is a sectional view of a valve stem seal installed on an engine valve.

Referring to FIGS. 3, 4 and 5, in accordance with the present invention, the prior art valve stem seal is replaced by a ring seal 36 which is received in a groove formed in the valve stem and acts against the inside diameter of the valve guide 12.

FIG. 4 illustrates one preferred embodiment of the seal 36 wherein the surface of the seal in contact with the valve guide is formed as a plurality of concentric ribs 38 separated by grooves 40'.

FIG. 5 illustrates another preferred embodiment of the seal element 36' wherein the surface of the seal in contact with the valve guide is formed as a single rib 38 arranged helically whereby groove 40' meters some oil along the stem/guide interface from one side of the seal to the other.

Referring again to FIG. 3, the location of the seal on the valve stem places the seal much closer to the head end of the valve as compared with the prior art design, and thus provides improved lubrication for the stem/guide interface since the annular space 42 between the stem and the guide on the tip end of the valve will be maintained full of oil while not permitting an excessive amount of oil to reach the head end of the valve. Increased oil in this area also serves to improve heat transfer between the valve and the coolant in passages 44 and 46. Other advantages offered by the present design include (a) the ability to apply the valve seal prior to assembling the cylinder head, thus eliminating a difficult assembly operation, (b) the potential for reducing the length of the valve with the attendant reduction of engine height, since a portion of the length of a typical valve is a function of the distance between the valve keeper groove and the stem seal in the prior art construction, (c) an inherent aligning effect on the valve within the guide, and (d) lower cost. In addition to the above, the improved lubrication aspects of the present invention can eliminate the need for chrome plating or other surface treatment of the valve stem and thus provide additional savings in the cost of an engine.

The seal element 36 can be formed of any one of several materials; however, materials such as silicone, fluorosilicone and fluorocarbon elastomers and Highly Saturated Nitride (HSN) elastomers are considered to be particularly suitable for the application. The seal can also be formed as a split ring, similar to a piston ring, wherein a metal, plastic or ceramic material can be used.

I claim:

1. In an internal combustion engine comprising a cylinder head, a tubular valve guide received in a bore formed in said cylinder head, a poppet valve having a stem portion slidingly received in said valve guide, and a valve stem seal substantially preventing engine oil from traveling past said valve guide to the head end of said poppet valve; the improvement wherein an annular groove is formed in said stem portion and said valve stem seal comprises a ring type seal element received in said groove and in sealing contact with the inside diameter of said valve guide.

2. Apparatus as claimed in claim 1, in which said seal element is formed of an elastomeric material.

3. Apparatus as claimed in claims 1 or 2 in which said seal element is a substantially toroidal member having one or more outwardly projecting lip elements formed on the outer surface thereof.

4. Apparatus as claimed in claims 1 or 2 in which said seal element is substantially toroidal member having a plurality of circumferential ribs separated by circumferential grooves formed on the outer surface thereof.

5. Apparatus as claimed in claims 1 or 2, in which said seal element is a substantially toroidal member having a helical rib formed on the outer surface thereof, said rib being formed to define a helical groove separating the convolutions of said rib.

6. Apparatus as claimed in claims 1 or 2 in which said seal element is located on said stem portion such that the distance between the end of the valve guide closest to the head end of the valve and the seal element is less than the distance between the opposite end of the valve guide and the seal element when the valve is in a closed position.

7. A poppet valve for an internal combustion engine comprising a head portion and a cylindrical stem portion, said stem portion having an annular groove formed therein; including in combination therewith a substantially toroidal seal element received in said groove.

8. A poppet valve as claimed in claim 7, in which said seal element includes one or more outwardly projecting lip elements formed on the outer surface thereof.

9. A poppet valve as claimed in claim 7, in which said seal element includes a plurality of circumferential ribs separated by circumferential grooves formed on the outer surface thereof.

10. A poppet valve as claimed in claim 7, in which said seal element includes a helical rib formed on the outer surface thereof, said rib being formed to define a helical groove separating the convolutions of said rib.

* * * * *